(12) United States Patent
Abe et al.

(10) Patent No.: US 8,675,808 B2
(45) Date of Patent: Mar. 18, 2014

(54) NATURAL CIRCULATION TYPE BOILING WATER REACTOR

(75) Inventors: Nobuaki Abe, Yokohama (JP); Yutaka Takeuchi, Tochigi (JP); Yukio Takigawa, Yokohama (JP); Mikihide Nakamaru, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1573 days.

(21) Appl. No.: 12/063,500

(22) PCT Filed: Aug. 11, 2006

(86) PCT No.: PCT/JP2006/315909
§ 371 (c)(1),
(2), (4) Date: Feb. 11, 2008

(87) PCT Pub. No.: WO2007/018286
PCT Pub. Date: Feb. 15, 2007

(65) Prior Publication Data
US 2009/0116608 A1 May 7, 2009

(30) Foreign Application Priority Data

Aug. 11, 2005 (JP) .................................. 2005-233750

(51) Int. Cl.
*G21C 15/00* (2006.01)
(52) U.S. Cl.
USPC ............ 376/370; 376/347; 376/361; 376/366
(58) Field of Classification Search
USPC ......... 376/370, 277, 283, 347, 352, 399, 402, 376/373, 389
See application file for complete search history.

(56) References Cited

U.S. PATENT DOCUMENTS

| 3,150,051 A | * | 9/1964 | Ammon ..................... 376/400 |
| 4,947,485 A | | 8/1990 | Oosterkamp |
| 5,100,609 A | * | 3/1992 | Oosterkamp ............... 376/210 |
| 5,106,573 A | * | 4/1992 | Fennern ..................... 376/371 |
| 5,406,597 A | * | 4/1995 | Fennern et al. ............. 376/232 |

FOREIGN PATENT DOCUMENTS

| JP | 63 52097 | 3/1988 |
| JP | 2 59697 | 2/1990 |
| JP | 2 80998 | 3/1990 |
| JP | 2 51796 | 10/1990 |
| JP | 2 268294 | 11/1990 |
| JP | 3 95496 | 4/1991 |

(Continued)

OTHER PUBLICATIONS

Small and Medium Sized Reactors: Status and Prospects, May 27-31, 2001, International Atomic Energy Agency (IAEA), pp. 225, 275, and 277.*

(Continued)

*Primary Examiner* — Jack W Keith
*Assistant Examiner* — Marshall O'Connor
(74) *Attorney, Agent, or Firm* — Oblon, Spivak, McClelland, Maier & Neustadt, L.L.P.

(57) ABSTRACT

A natural-circulation type boiling water reactor includes a plurality of divided chimneys provided above a reactor core and a number of fuel assemblies are charged in the reactor core. The natural-circulation type boiling water reactor is provided with a pressure equalization structure arranged on rectangular-columnar lattice plates of the divided chimneys for equalizing pressures in divided chimney portions so as to equalize the pressures of the divided chimneys with the pressure equalization structure.

10 Claims, 12 Drawing Sheets

(56) References Cited

FOREIGN PATENT DOCUMENTS

| | | |
|---|---|---|
| JP | 4 259894 | 9/1992 |
| JP | 6 75073 | 3/1994 |
| JP | 2000 137090 | 5/2000 |
| JP | 2003 344574 | 12/2003 |

OTHER PUBLICATIONS

Heru Kuncoro, et al., "Study of Flow Instability Characteristic in SBWR", Japan Mechanical Association, Aug. 31, 1995, AW pp. 93-94 (with partial English translation).*

Kuncoro, Heru et al., "Shizen Junkangata Genshiro Ni Okeru Ryudo Fuantei Gensho Ni Kansuru Kenkyu", The Japan Society of Mechanical Engineers Dai 73 Ki Zenkoku Taikai Koen Tonbunshu, p. 92 and 94, 1995.

Abe, N. et al., "Two-Phase Flow Natural Circulation Characteristics Inside BWR Vessels", Nuclear Engineering and Design, vol. 146, pp. 253 to 265, 1994.

Heru Kuncoro, et al., "Study of Flow Instability Characteristic in SBWR", Japan Mechanical Association, Aug. 31, 1995, pp. 93-94 (with partial English translation).

* cited by examiner

NATURAL CIRCULATION TYPE BOILING WATER REACTOR

TECHNICAL FIELD

The present invention relates to a natural-circulation boiling water reactor improved in safety by securing preferable natural-circulation characteristics.

BACKGROUND ART

In the natural-circulation boiling water reactor (referred hereunder to as the natural-circulation BWR), in order to secure a natural circulation flow rate, a pressure vessel of the reactor is arranged with an axial long length and a reactor core is arranged at a relatively lower position within the pressure vessel of the reactor so as to form a large free space called a chimney over the reactor core.

The natural-circulation BWR does not include a re-circulation pump inside the reactor (internal pump) and a reactor re-circulation system (including a re-circulation pump outside the reactor and a jet pump) unlike a forced-circulation boiling water reactor (BWR), so that the fluid within a reactor pressure vessel is not to be forced-circulated by the recirculation pump inside the reactor.

In the natural-circulation BWR, the natural circulation flow rate is determined in accordance with the balance of a density difference between a downcomer part and the reactor core, that is, the pressure difference between vapor/liquid two-phase flow in the reactor core, and liquid flow in the downcomer. This natural circulation flow rate is ensured by increasing the water-level (head) of the downcomer part by elevating the reactor pressure vessel as well as by forming a chimney, which is a large free space, above the reactor core so as to reduce the pressure drop of the vapor/liquid two-phase flow in the chimney for reducing the water-head and to increase the water-head difference (head difference) due to the density difference between the inside and the outside of the shroud.

The chimney formed above the reactor core of a large-scale natural-circulation BWR is a very large free space with a radius of about 5 m and a height of about 10 m (see Patent Document 1: Japanese Unexamined Patent Application Publication No. HEI 02-80998, for example). When the free space is formed above the reactor core and the vapor/liquid two-phase flow discharged from the reactor core passes therethrough, a multi-dimensional flow is generated in the large space (chimney), which may prevent the natural re-circulation flow, providing a problem in the development of the natural-circulation BWR. The phenomenon of the multi-dimensional flow has been confirmed in the Russian natural-circulation BWR Vk-50.

Further, in order to figure out the behavior of the thermal flow in the chimney formed above the reactor core, a test of the vapor/liquid two-phase flow within the so-called large caliber vertical piping was performed in Ontario Hydro Technologies Canada.

This vapor/liquid two-phase flow test is a high-temperature and -pressure test using the vertical piping with a diameter of about 60 cm. From this test, it has been understood that the flow within the vertical piping with a diameter of about 60 cm is not a multi-dimensional but a one-dimensional stable flow.

On the basis of the result from the Canadian vapor/liquid two-phase flow behavior test, in a large-scale natural-circulation boiling water reactor, such as an SBWR, for ensuring the vapor/liquid two-phase stable flow in a chimney region, which is a large free space, a rectangular-columnar divided chimney composed of a plurality of square lattices is adopted. The divided chimney is about 60 cm square in size, and in the rectangular-columnar divided chimney with this size, the vapor/liquid two-phase stable flow is ensured like in the test in Ontario Hydro Technologies Canada.

In the natural-circulation BWR, by adopting the divided chimneys, the flow in each divided chimney is not the multi-dimensional flow, but it becomes a one-dimensional stable flow, enabling the stable natural circulation flow rate to be secured.

A natural-circulation reactor adopting the divided chimneys includes the technique disclosed in Patent Document 2 (Japanese Unexamined Patent Application Publication No. H04-259894). This natural-circulation reactor ensures preferable natural-circulation characteristics as well as suppresses the transient reduction in water level by adopting the divided chimneys. In the natural-circulation reactor adopting the divided chimneys, the chimney is vertically divided into two sections so that the flow-path sectional area of the upper divided chimney is smaller than that of the lower divided-chimney.

By adopting the divided chimneys in that a divided-chimney region is vertically divided into two sections so as to make flow-path sectional areas different from each other, the stable natural circulation flow rate can be secured while the stability may deteriorate. In general, the stability of the natural-circulation BWR is said to be weak.

In view of the stability, the stability of a boiling water reactor (BWR) includes channel stability, reactor core stability, and region stability. Among them, the channel stability is the thermal hydraulic stability concerning the flow rate changes by the feed back via the changes in pressure drop within a fuel channel (a channel box). The reactor core stability and the region stability mean the nuclear thermal hydraulic stability due to the nuclear feed back via changes in reactivity due to void changes in the reactor core. Furthermore, the reactor core stability is the stability in a basic mode of the neutron flux, in which the output of the entire reactor core integrally changes, while the region stability is stability in a higher mode of the neutron flux in accompany of space changes in reactor core output.

In a conventional BWR, the reactor core consists of a number of fuel assemblies (fuel channels), and on the top and bottom of the reactor core, plenums are provided in common to form a parallel passage system. When the parallel passage system is formed of a number of the fuel channels, even when flow fluctuations are generated in a specific fuel channel, the pressure drop between the plenums on top and bottom of the reactor core is maintained constant due to the presence of the large majority of the other stable fuel channels.

In the reactor core of the parallel passage system, even when flow fluctuations are generated in a specific fuel channel so that the pressure drop is to be changed, a force is applied to the fluid for returning this pressure drop to a predetermined value. The channel stability is stability of a single fuel channel under a boundary condition in that the upper plenum and the lower plenum function as a common pressure boundary of the reactor core so as to maintain the pressure drop of the fuel channel constant.

The fuel channel of the BWR forms a vertical heating passage, and the fluid flowing into the reactor core generates a void due to boiling. The vapor/liquid two-phase flow void-fraction distribution in the reactor core axial direction is like that the void-fraction distribution increases toward the top of the reactor core. Thereby, in accordance with the change in reactor-core inlet flow, the pressure drop of the vapor/liquid two-phase part varies with a time-lag along with the transport lag of the void.

In the vertical heating passage having the vapor/liquid two-phase flow like the reactor core of the BWR, in accordance with the change in inlet flow, the pressure drop of the vapor/liquid two-phase part varies with a time-lag along with the transport lag of the void. This pressure drop of the vapor/liquid two-phase flow with a time-lag becomes a feed back amount of the feed back loop of the channel stability. Generally, with increasing pressure drop through the vapor/liquid two-phase flow, or with increasing time-lag, the channel stability deteriorates.

In the case of the natural-circulation BWR, unlike the reactor core of the BWR, the pressure boundary on the top of the reactor core becomes the outlet of the divided chimney. If the combination of the fuel channel with the divided chimneys is assumed to be an imaginary fuel channel, the region of the vapor/liquid two-phase flow is elongated longer in comparison with the case without the chimneys so that the transport lag of the void is added in the chimneys. Thus, the pressure drop and the time-lag of the vapor/liquid two-phase flow are increased, so that the stability of the imaginary fuel channel may deteriorate.

In the natural-circulation BWR with the divided chimneys, there is no prior art aimed at the improvement in fuel channel stability.

In the natural-circulation BWR with the divided chimney, the multi-dimensional flow is suppressed, so that the flow becomes stable one-dimensional flow to secure the natural-circulation flow rate; however, if the combination of the fuel channel with the divided chimneys is assumed to be an imaginary fuel channel, the region of the vapor/liquid two-phase flow is elongated in the axial direction of the reactor core, so that the transport lag of the void is added in the chimney, which may result in the deterioration in stability of the imaginary channel.

Figure 13:
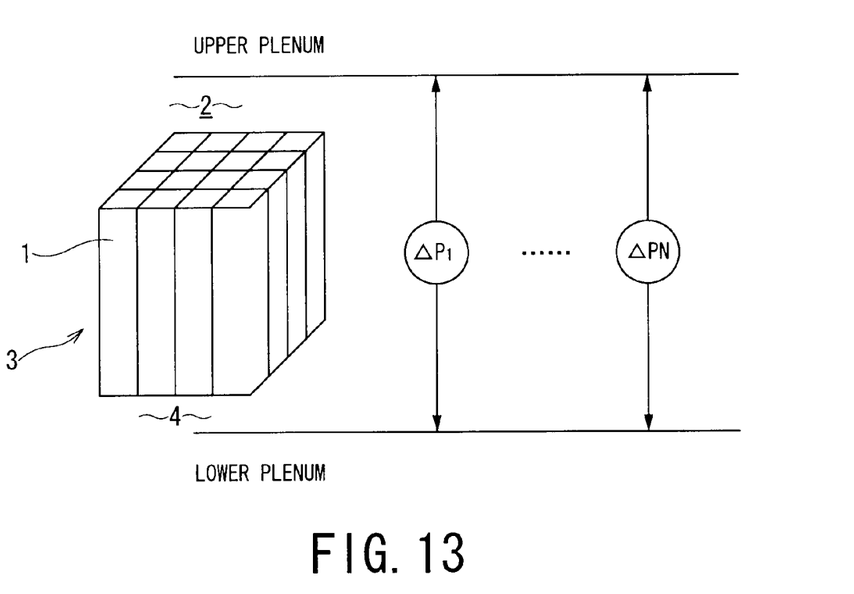
FIG. 13 is an explanatory view illustrating the channel stability of a conventional water boiling nuclear reactor.

In a conventional BWE, as shown in FIG. 13, the channel stability is evaluated under the condition that the pressure drop $\Delta p$ in each fuel assembly 1 of the whole reactor core is unified in the upper plenum 2 of the reactor core outlet. In a reactor core 3 of the conventional BWR, several hundreds of the fuel assemblies 1 are arranged, and the nuclear fuel assemblies 1 are loaded in the reactor core 3 to form a parallel passage.

In the reactor core 3 forming the parallel passage, even when fluid vibration is generated in a specific fuel assembly (fuel channel) 1, the vibration is absorbed by a number of fuel channels in its vicinity, so that a feed back effect, in which each channel pressure difference $\Delta p$ ($\Delta p_1$ to $\Delta p_N$) between the upper plenum 2 and a lower plenum 4 of the reactor core is maintained substantially constant, acts on the channel flow rate.

In the acting process of the feed back effect maintaining the channel pressure difference $\Delta p$ constant, since the fuel channel is in the vapor/liquid two-phase state, the time-lag from flow rate change to pressure change is generated, so that the fuel channel may be instabilized under a certain vapor/liquid two-phase condition. In a low flow rate and a long passage, in which the time-lag is large due to the change in pressure drop of the vapor/liquid two-phase state, or when the change in pressure drop of the vapor/liquid two-phase flow has large gain, the stability may be more deteriorated.

Figure 14:
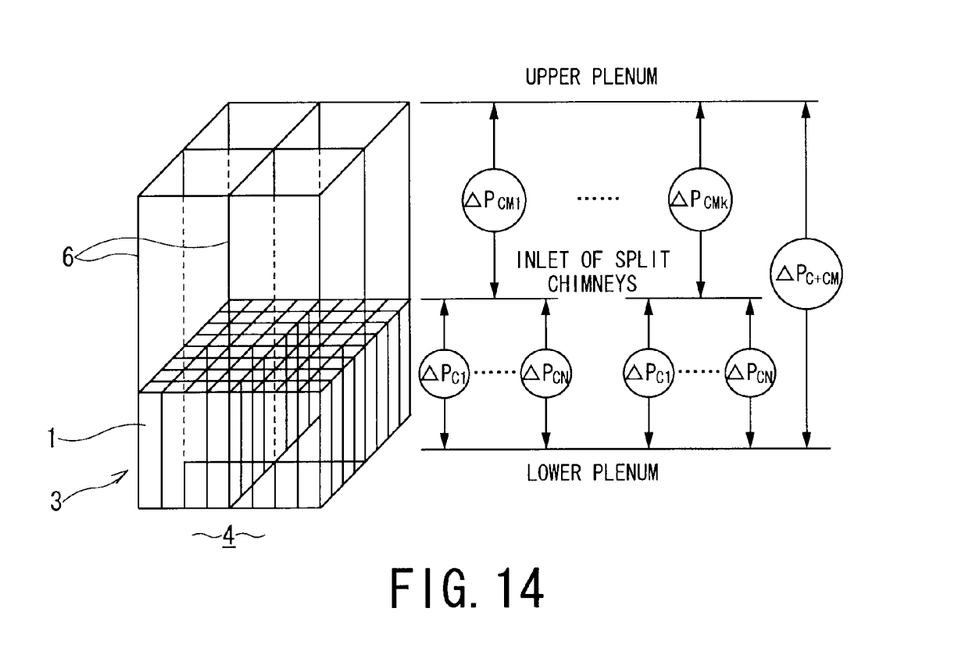
FIG. 14 is an explanatory view illustrating the channel stability of a natural-circulation BWR with divided chimneys.

In the natural-circulation BWR with the divided chimneys, as shown in FIG. 14, pressures of the fuel channels flowing in divided chimneys 6 are once unified (unified in "N" fuel channels 1 with pressure differences $\Delta p_{C1}$ to $\Delta p_{CN}$), and then, the whole fuel assemblies 1 are unified at the outlet of the chimneys 6 (unified in the "k" divided chimneys 6 with pressure differences $\Delta p_{CM1}$ to $\Delta p_{CMk}$).

Thus, if the combination of the fuel assemblies 1 with the divided chimneys 6 is assumed to be an imaginary fuel channel, in the imaginary fuel channel, the region of the vapor/liquid two-phase flow is elongated by the length of the divided chimneys in the axial direction in comparison with the fuel assemblies 1 of the reactor core of the conventional BWR, so that the transport lag of the void is added in the divided chimneys.

Accordingly, in the natural-circulation BWR, the stability, such as the channel stability of the imaginary fuel channel, may be deteriorated.

DISCLOSURE OF THE INVENTION

The present invention has been made in view of the circumstances mentioned above, and it is an object thereof to provide a natural-circulation boiling water reactor in which preferable natural-circulation characteristics are ensured and the stability is improved.

A natural-circulation type water boiling nuclear reactor according to the present invention includes a plurality of divided chimneys provided above a reactor core and is charged with a number of fuel assemblies in the reactor core, in which a pressure equalization structure is provided on a divided chimney portion of rectangular-columnar lattice plates of the divided chimneys arranged at an outlet of the reactor core for equalizing pressures in divided chimney parts, in which the pressures of the divided chimney portions are equalized by the pressure equalization structure.

Furthermore, a natural-circulation type boiling water reactor according to the present invention includes a plurality of divided chimneys provided above a reactor core and is charged with a number of fuel assemblies in the reactor core, in which a region of the divided chimneys is divided into a plurality of regions in a chimney height direction and a cross sectional area of rectangular-columnar lattice plates of an upper group of the divided chimneys is configured to be larger than that of the rectangular-columnar lattice plates of a lower group of the divided chimneys so as to equalize the pressures of the fuel assemblies arranged in an intermediate section in the chimney height direction.

Furthermore, a natural-circulation type boiling water reactor according to the present invention includes a plurality of divided chimneys provided above a reactor core and is charged with a number of fuel assemblies in the reactor core, in which a region of the divided chimneys is divided into a plurality of groups in a chimney height direction, and a central position of rectangular-columnar lattice plates of an upper divided chimney group is laterally shifted from that of the rectangular-columnar lattice plates of a lower divided chimney group so as to equalize the pressures of the fuel assemblies in an intermediate portion of the divided chimneys in the divided-chimney height direction.

According to the natural-circulation type boiling water reactor of the present invention, the pressures of the divided chimney portions or the fuel assemblies can be equalized on the upstream side from the outlet of the divided chimneys, so that the position of the pressure boundary of the upper part of the reactor core, which is important for the stability, can be lowered. The vapor/liquid two-phase flow region can be reduced, eliminating the transport lag within the divided-chimneys, so that the stability can be improved.

Furthermore, the present invention will become apparent as the following description proceeds with reference to the accompanying drawings.

BEST MODE FOR CARRYING OUT THE INVENTION

Embodiments of a natural-circulation boiling water nuclear reactor according to the present invention will be described with reference to the attached drawings.

First Embodiment

Figure 1:
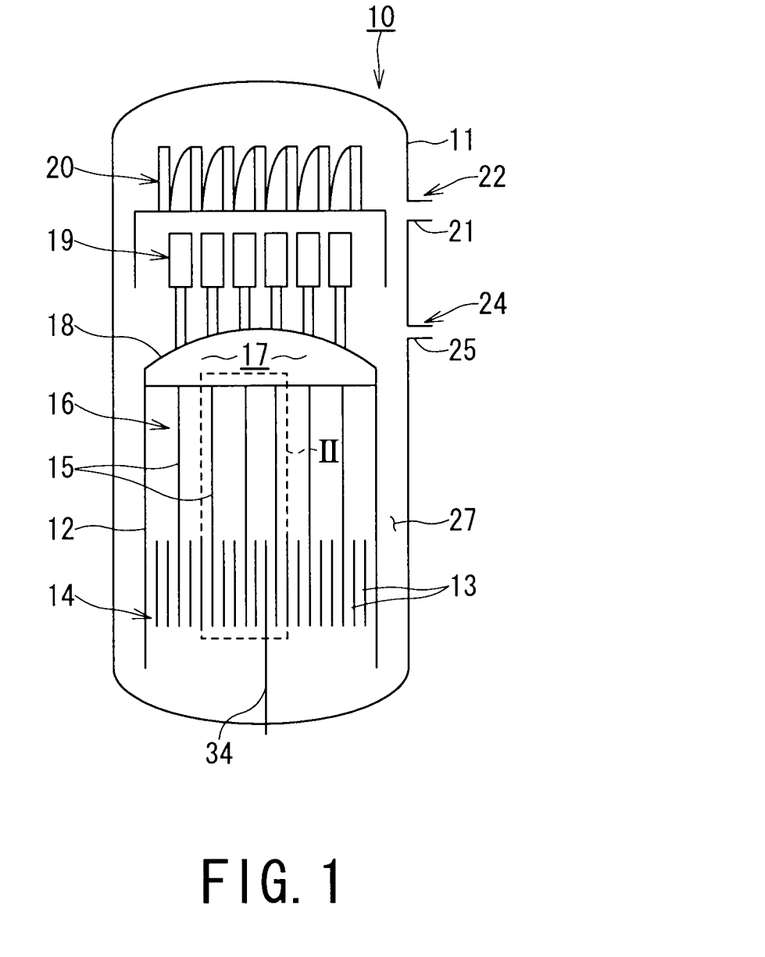
FIG. 1 is a schematic elevational sectional view of a natural-circulation BWR according to a first embodiment of the present invention.

FIG. 1 is a conceptual structure drawing of a natural-circulation boiling water reactor (hereunder referred to a natural-circulation BWR) according to a first embodiment of the present invention. In the natural-circulation BWR 10, a reactor core shroud 12 is provided in a reactor pressure vessel 11, and several hundreds of many fuel assemblies 13, about 800 fuel assemblies, for example, are charged into the reactor core shroud 12 to form a reactor core 14. The reactor core 14 is provided in a lower portion of the reactor core shroud 12, and a plurality of rectangular-columnar divided-chimneys 15 are provided above the reactor core 14. A plurality of the divided chimneys 15 are combined into a group of the divided chimneys 15.

A plurality of the divided chimneys 15 are summarized into a chimney 16, and each of the divided chimneys 15 is provided with a free space formed inside. In the reactor core 14, a number of the fuel assemblies 13 are aligned in a tetragonal lattice arrangement to form a parallel passage in the reactor core. The reactor core 14 includes the group of the divided chimneys 15 arranged in its upper portion to form a parallel passage system having common plenums 17 and 28 arranged in upper and lower portions of the group of the divided chimneys 15.

On the outlet side of the chimney 16, the upper plenum 17 of the reactor core is formed, which is covered with a shroud head 18. On the shroud head 18, a number of steam separators 19 are arranged in a bristling state, and on the steam separators 19, a steam dryer 20 is provided. The steam dryer 20 removes the wet humidity from the steam separated by the steam separators 19 to thereby form dry steam by drying the steam, which is then supplied to a steam turbine (not shown) as main steam from a main steam pipe 21. The main steam pipe 21 constitutes a main steam system 22.

The steam is expanded due to the working in the steam turbine for generating electric power and is discharged to a condenser (not shown). In the condenser, the steam condenses (is cooled) into condensate. This condensate passes through a condensate feeding system 24 so as to be fed back into the reactor pressure vessel 11 via feed piping 25 as feed water.

The feed water fed back into the reactor pressure vessel 11 is mixed with the water (returned water), which is separated from steam in steam condenser separators 19 and is led to a downcomer part 27. The downcomer part 27 is a sleeve-like or cylindrical annular space formed between the reactor pressure vessel 11 and the reactor core shroud 12, and the mixed flow of the feed water with the coolant for reactor water is lowered by natural circulation using the water head difference between upper and lower portions of the downcomer part 27, and is led to a lower reactor-core plenum 28 on the bottom side of the reactor core 14.

The mixed flow that has fallen through the downcomer part 27 is inverted by the lower reactor-core plenum 28 to become an ascending flow and is led to an inlet of the reactor core in its lower portion. The mixed flow is heated during the passing through the reactor core 14 due to the nuclear heating effect to become a vapor/liquid two-phase flow and enter the divided chimneys 15. Then, the vapor/liquid two-phase flow rises through an upper reactor-core plenum 17 so as to be led to the steam separators 19 for being separated from the steam.

On the other hand, the reactor core 14 is structured in the lower portion of the reactor core shroud 12 and is accommodated within the reactor pressure vessel 11, the reactor core 14 having a number of the fuel assemblies 13 loaded therein. The rectangular-columnar divided chimneys 15 are provided above the reactor core 14, and the divided-chimney 15 is formed of lattice plates 30 in a rectangular-columnar shape to form a free space inside. The divided-chimney 15 is connected to the neighboring divided-chimney via a pressure equalization tube 31, so that the pressure of the divided chimneys 15 adjacent to each other is equally adjusted due to the pressure equalization tube 31. The pressure equalization tube 31 is located at a position lower than the intermediate height region of the divided chimneys 15 in its axial direction so as to form a pressure equalization structure of the divided chimneys 15. The rectangular-columnar divided-chimney 15 has a size of about 60 cm square and a height in the axial direction from several meters to ten and several meters, 10 meters, for example. The chimney 16 has a whole diameter of about 5 meters, which is the sum of the diameters of the divided chimneys 15, and a height in the axial direction of 10 meters, for example.

Furthermore, in the fuel assemblies 13 constituting the reactor core 14, a number of fuel rods are accommodated in a rectangular-columnar channel box 33 in a tetragonal lattice arrangement. Control rods 34 are charged in and out between a number of the fuel assemblies 13 by a control rod drive unit (not shown) so as to adjust the reactor output. The control rod 34 has a cruciform cross-section and is charged in out between combinations of four fuel assemblies 13 for adjustment controlling.

Figure 2:
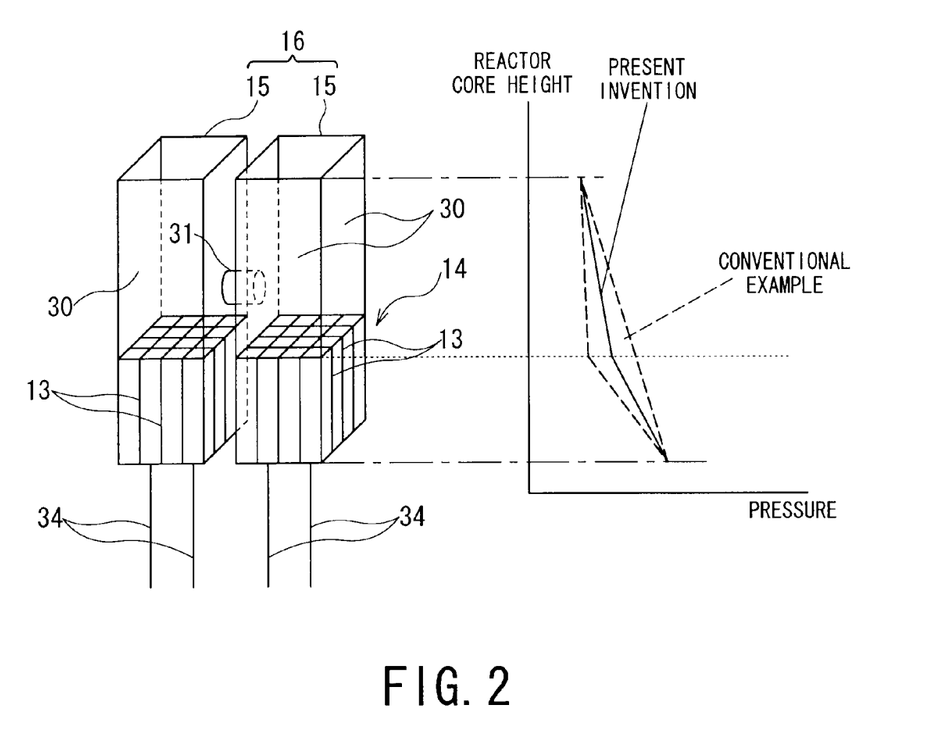
FIG. 2 is an enlarged perspective view of A portion of FIG. 1 as well as showing the relationship between the height and the pressure.

In the divided chimneys 15 adjacent to each other arranged above the reactor core 14, as shown in FIG. 2, the space pressure in a divided-chimney 15 is equalized to that of the neighboring divided-chimney 15 due to the pressure equalization tube 31 connected therebetween. That is, referring to FIG. 2, according to the present invention, the relationship between the reactor core height and the pressure is shown by a solid line, while according to the conventional example, the relationship varies between dotted lines.

Figure 3:
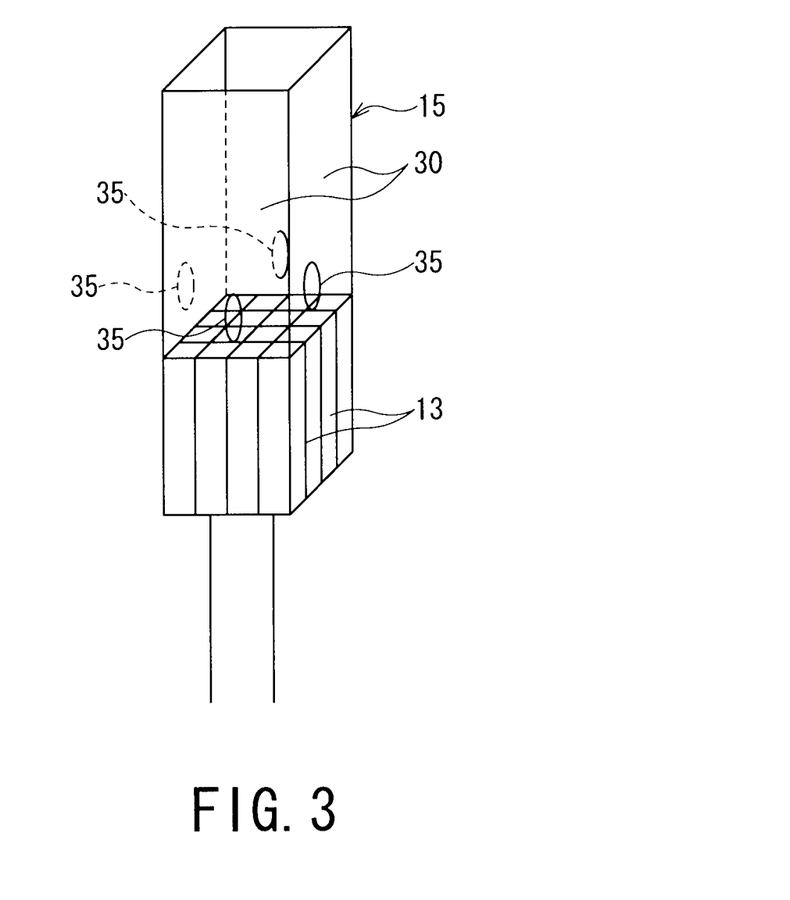
FIG. 3 is a perspective view of the divided chimneys provided in the natural-circulation BWR shown in FIG. 1.

In the pressure equalization structure for equalizing pressures of the divided chimneys 15, instead of the pressure equalization tube 31, connection holes 35 may be formed on the divided-chimney 15 in the vicinity of its inlet as shown in FIG. 3. The shape of the connection holes 35 may include a circle, ellipse, oblong and rectangle. The connection holes 35 are formed on each plate surface of the lattice plates 30 provided in the inlet of the rectangular-columnar divided chimneys 15, respectively.

In the natural-circulation BWR10 according to the embodiment, a number of the fuel assemblies 13 are accommodated within the reactor pressure vessel 11 to form the reactor core 14 in a lower portion of the reactor core shroud 12, and the divided chimney group is provided on the outlet side of each fuel assembly 13 by bundling the divided chimneys 15.

In the divided chimneys 15 adjacent to each other, the pressures of the divided chimneys can be equalized by the pressure equalization tube 31 or the connection holes 35 formed on each divided-chimney 15. That is, the pressures of the whole fuel assemblies 13 can be equalized in the divided chimneys provided at the outlets of the fuel assemblies 13 constituting the reactor core 14.

Accordingly, the pressure boundary in an upper portion of the reactor core, which is important for the channel stability of the fuel channels, is shifted from the outlet of the divided chimneys 15 to the connection holes 35 or the pressure equalization tube 31 on the inlet side of the divided chimneys 15 so as to reduce the vapor/liquid two-phase flow region, eliminating or largely improving the transport lag within the divided chimneys 15, thereby improving the stability.

Modifications of First Embodiment

Figure 4:
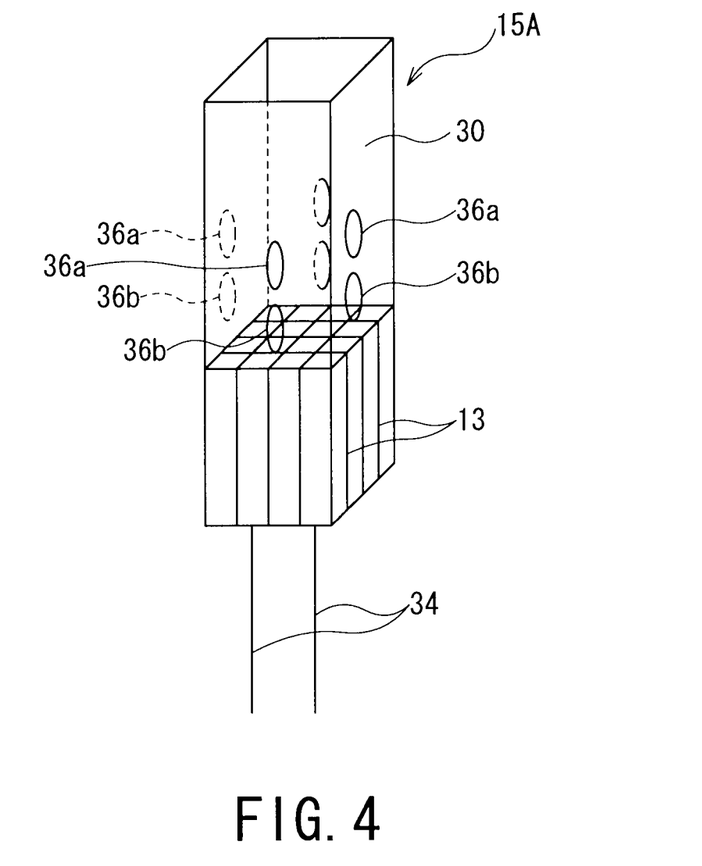
FIG. 4 is a perspective view of the divided chimneys of a first modification provided in the natural-circulation BWR.

FIG. 4 shows a first modification of the first embodiment of the natural-circulation BWR according to the present invention.

Since divided chimneys 15A of the first modification are different from the divided chimneys 15 shown in FIGS. 2 and 3, and other configurations and effects are the same as those of the natural-circulation BWR10 shown in FIG. 1, like reference characters designate like components common thereto, and the duplicated drawings and description thereof are eliminated herein.

In the divided chimneys 15A shown in FIG. 4, a plurality of connection holes 36a and 36b are formed in the vertical direction at the lower portions of each plate surface of each of the rectangular-columnar lattice plates 30.

Figure 5:
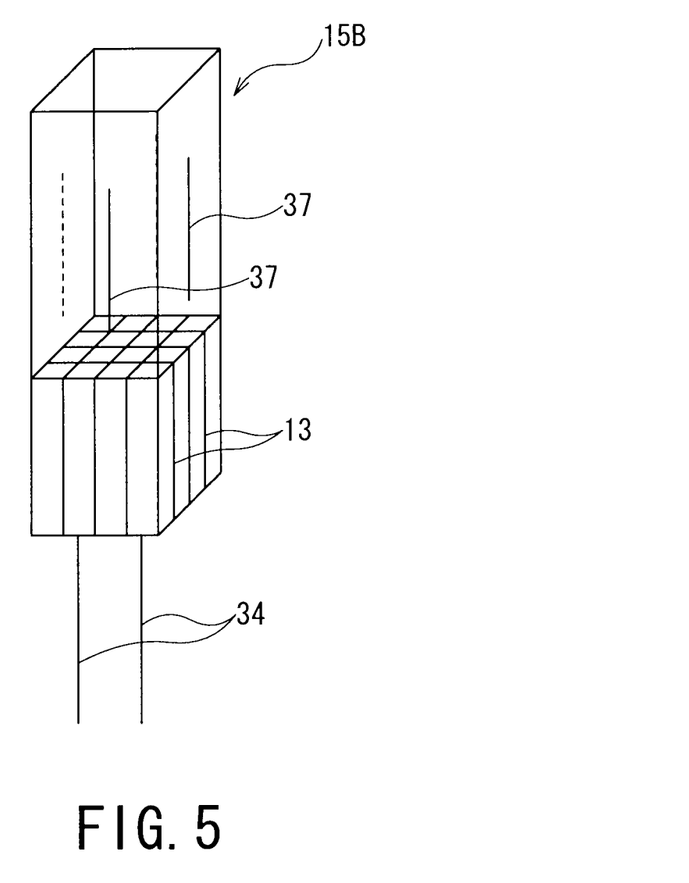
FIG. 5 is a perspective view of the divided chimneys of a second modification provided in the natural-circulation BWR.

FIG. 5 shows a second modification of the first embodiment of the natural-circulation BWR according to the present invention.

In divided chimneys 15B of the second modification, a slit 37 extending in the chimney axial direction is formed on each of the rectangular-columnar lattice plates 30. In FIG. 5, the vertical slit 37 is formed, but alternatively, horizontal slits may also be formed on the rectangular-columnar lattice plates 30 in a multiple column in the chimney axial direction.

Figure 6:
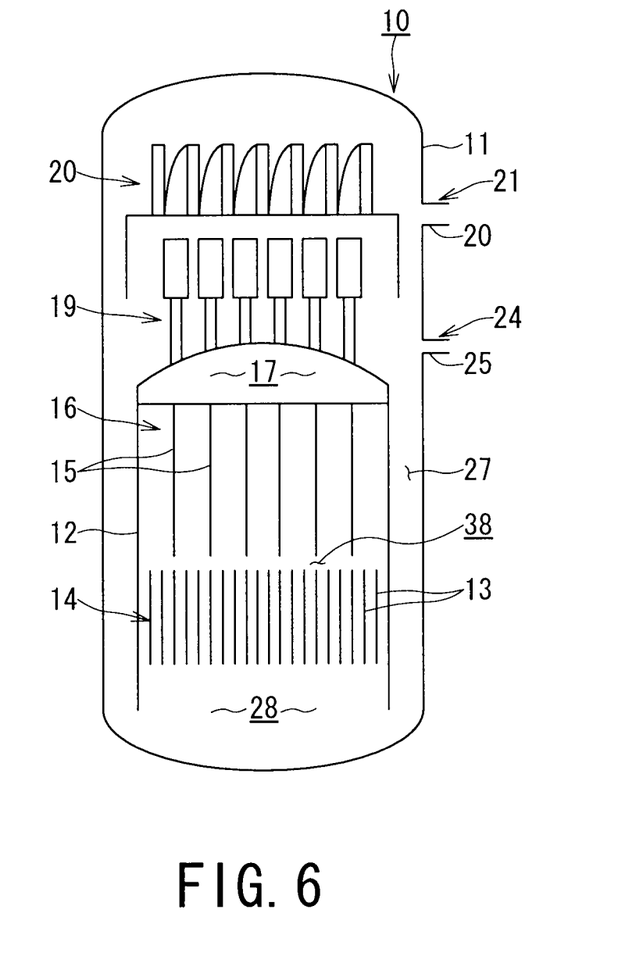
FIG. 6 is a schematic elevational sectional view of the natural-circulation BWR, showing the divided chimneys of a third modification provided in the natural-circulation BWR.

Furthermore, FIG. 6 shows a third modification of the first embodiment of the natural-circulation BWR according to the present invention.

In the natural-circulation BWR10 of the third modification, instead of forming the connection holes 35, 36a and 36b or the slit 37 on each of the divided chimneys 15, a clearance 38 is formed between the top of the fuel assemblies 13 constituting the reactor core 14 and the inlet (bottom) of the divided chimneys 15.

In the natural-circulation BWR10, the divided chimneys 15 provided above the group of the fuel assemblies 13 are provided with the pressure equalization tube 31 so as to communicate the divided chimneys 15, 15 adjacent to each other, or by providing at least one connection hole 35, 36a and 36b or the slit 37 on the rectangular-columnar lattice plate 30 of each of the rectangular-columnar divided chimneys 15, or by furthermore forming the clearance 38 between the top of the group of the fuel assemblies 13 and the bottom of the group of the divided chimneys 15, the pressures of the whole fuel assemblies 13 can be equalized in the divided chimneys provided at the outlet of the fuel assemblies 13. A plurality of the connection holes 36a and 36b are formed on the divided chimneys 15 on the lower side in the chimney axial direction. On the other hand, the slit 37 is formed to range from the bottom of the intermediate portion of the lattice plate 30 toward the lower portion thereof. The slit 37, instead of forming in the vertical direction, may also be formed in the horizontal direction (width direction) in one or more columns.

By equalizing the pressures of the whole fuel assemblies 13 and 13 at the divided chimneys 15, the pressure boundary in an upper portion of the reactor core, which is important for the channel stability of the fuel channels, can be shifted in the lower direction from the outlet of the divided chimneys 15 to the inlet side of the divided chimneys 15 so as to reduce the vapor/liquid two-phase flow region to thereby eliminate the transport lag in the group of the divided chimneys 15, so that the stability, such as channel stability, can be improved.

Second Embodiment

Figure 7:
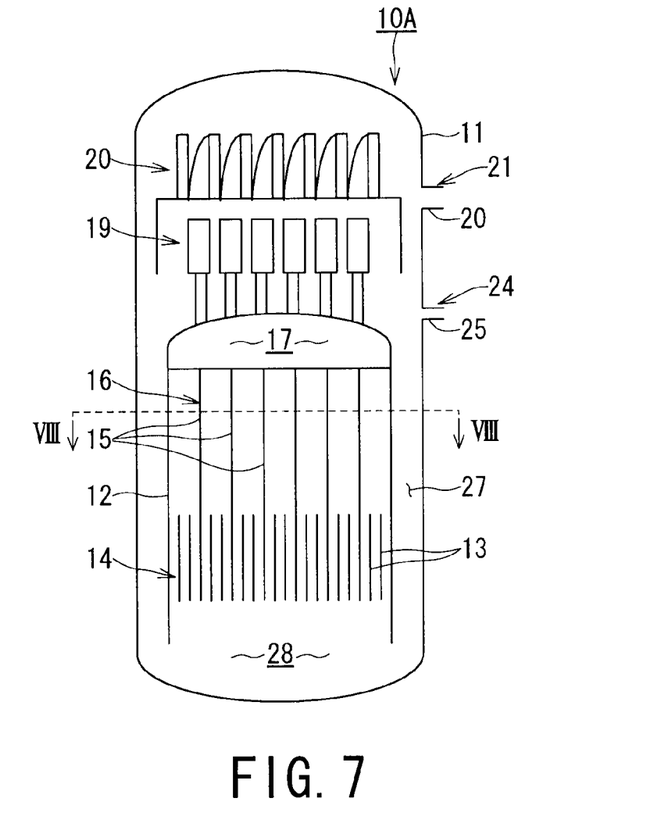
FIG. 7 is a schematic elevational sectional view of a natural-circulation BWR according to a second embodiment of the present invention.
Figure 8:
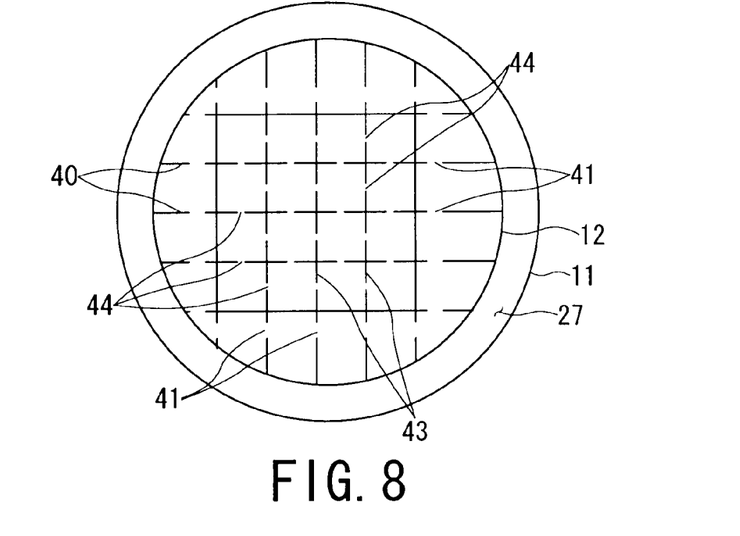
FIG. 8 is a planar sectional view at the line VIII-VIII of FIG. 7.

FIGS. 7 and 8 are drawings showing a natural-circulation BWR according to a second embodiment of the present invention.

FIG. 7 is a schematic elevational sectional view of the natural-circulation BWR according to the second embodiment and FIG. 8 is a cross-sectional view taken along the line VIII-VIII of FIG. 7.

In a natural-circulation BWR10A according to the second embodiment, like reference characters designate like components common to the natural-circulation BWR 10 according to the first embodiment, and the duplicated description is omitted herein.

In the natural-circulation BWR 10A shown in FIG. 7, above the group of the fuel assemblies 13 constituting the reactor core 14, a plurality of the rectangular-columnar divided chimneys 15 are provided by bundling them to form the chimney 16 composed of the group of the divided chimneys 16.

In the divided chimneys 15 constituting the chimney 16, at least one connection hole 41 is formed on rectangular-columnar lattice plates 40 of the divided chimneys 15 arranged in an outermost circumferential region. The connection hole 41 on each lattice plate 40 of the divided chimneys 15 adjacent to each other arranged in the outermost circumferential region is formed larger in diameter than at least one connection hole 44 on each lattice plate 43 of the divided chimneys 15 arranged in the central regions other than the outermost circumferential region so that the pressures of the fuel assemblies 13 arranged in the peripheral section, where the channel flow rate is small and the reactor output is increased, are equalized.

In the natural-circulation BWR 10A according to the second embodiment, the pressures of the fuel assemblies 13 as well as the fuel assemblies 13 arranged in the peripheral section about the reactor core 14 in the reactor pressure vessel 11, where the reactor output is largely different, can be equalized.

As a result, the position of the pressure boundary of the upper part of the reactor core, which is important for the stability, can be lowered to positions of the connection holes 41 and 44 of the divided chimneys 15 so as to reduce the vapor/liquid two-phase flow region, eliminating the transport lag in the divided-chimneys 15, thus improving the stability.

In the connection holes 41 and 44 formed on the divided chimneys 15, the connection hole 41 of the divided chimneys 15 arranged on the outermost circumferential region corresponding to the peripheral section of the fuel assemblies 13 is formed larger in diameter than the connection hole 44 of the residual divided chimneys 15. One or more of the connection holes 41 and 44 may be formed at an appropriate position of the lattice plates 40 and 43. The shape of each of the connection holes 41 and 44 may include a circle, rectangle, ellipse, oblong, and slit.

The connection holes 41 and 44 on the divided chimneys 15 may be preferably formed so as to correspond to the lower side rather than the central region in the chimney axial direction. Each of the connection holes 41 and 44 may be formed at an appropriate position of the rectangular-columnar lattice plates 40 and 43 of the divided chimneys 15, but alternatively, a plurality of the holes may be formed on the whole plate surface of the lattice plates 40 and 43 along the vertical direction. In any case, in the connection holes 41 and 44 formed on the divided chimneys 15, it is taken into consideration that at least one hole of the respective holes is formed in the vicinity of the outlet of the group of the fuel assemblies 13 so that the pressure boundary of the upper part of the reactor core is formed at a position lower than the reactor-core upper plenum 17.

Third Embodiment

Figure 9:
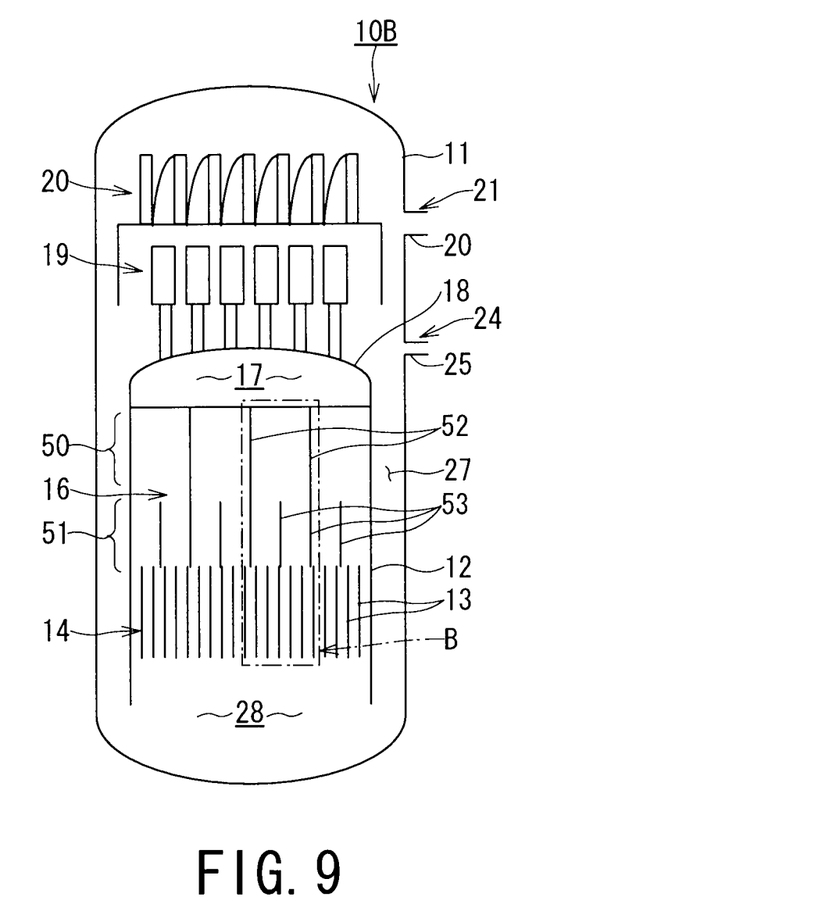
FIG. 9 is a schematic elevational sectional view of a natural-circulation BWR according to a third embodiment of the present invention.
Figure 10:
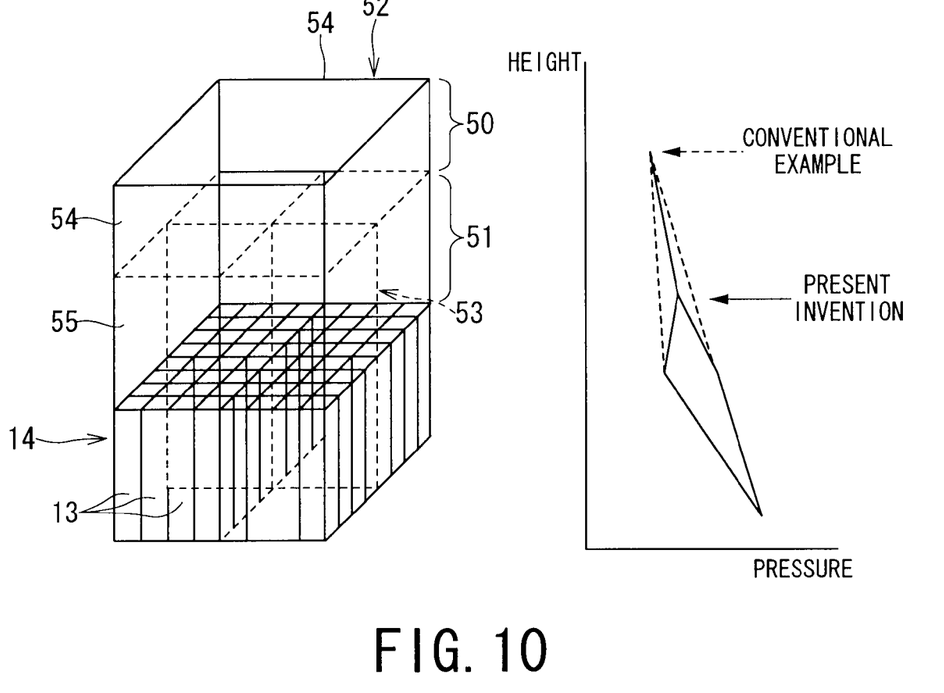
FIG. 10 is an enlarged perspective view of B portion of FIG. 9 as well as showing the relationship between the height and the pressure.

FIGS. 9 and 10 are drawings showing a natural-circulation BWR according to a third embodiment of the present invention.

FIG. 9 is a schematic elevational sectional view of the natural-circulation BWR 10B according to the third embodiment and FIG. 10 is an enlarged drawing of B portion of FIG. 9 as well as showing the relationship between the height of the reactor core and the divided chimneys 15 in the axial direction and the reactor pressure.

In the natural-circulation BWR 10B according to the third embodiment, like reference characters designate like components common to the natural-circulation BWR 10 according to the first embodiment, and the duplicated description is omitted herein.

In the natural-circulation BWR 10B shown in FIG. 9, divided chimney regions 50 and 51 are divided into a plurality of regions in the height direction in the chimney 16 formed in the upper portion of the reactor core 14 in the reactor pressure vessel 11. In FIG. 9, the divided chimney regions 50 and 51 are vertically divided into two in the axial direction of the chimney 16.

A rectangular-columnar divided chimney group 52 corresponding to the upper divided chimney region 50 has divided-chimney lattice plates 54 smaller in the number of plates than divided-chimney lattice plates 55 of a rectangular-columnar divided chimney group 53 corresponding to the lower divided chimney region 51, so that the cross-sectional area of the upper divided chimney 52 is substantially equalized to the sum of the cross-sectional areas of a plurality, four for example, of the lower divided chimneys 53.

In the chimney 16 on a plan view, it is established that the cross-sectional area of the upper divided chimney 52 is substantially the same as the sum of the cross-sectional areas of a plurality, four for example, of the lower divided chimneys 53, and the boundary position of the upper and lower divided chimneys 52 and 53 is set lower than the position of the outlet of conventional divided chimneys.

The upper and lower divided chimney regions 50 and 51 are divided into a plurality of regions in the chimney height direction (chimney axial direction), and the cross-sectional area of the upper divided chimney 52 is equalized to the sum of the cross-sectional areas of a plurality of the lower divided chimneys 53, so that on the upstream side of the divided chimneys 52 and 53, as shown in FIG. 10, the pressures of the fuel assemblies 13 (reactor pressures) is equalized.

As a result, the pressure boundary in an upper portion of the reactor core, which is important for the stability, can be lowered in position. The pressure boundary position in the upper portion of the reactor core can be lowered more than the position of the outlet of the divided chimneys of a conventional natural-circulation BWR so as to reduce the vapor/liquid two-phase flow region to thereby eliminate the transport lag in the divided chimneys so as to improve the stability such as channel stability.

Modifications of Third Embodiment

Figure 11:
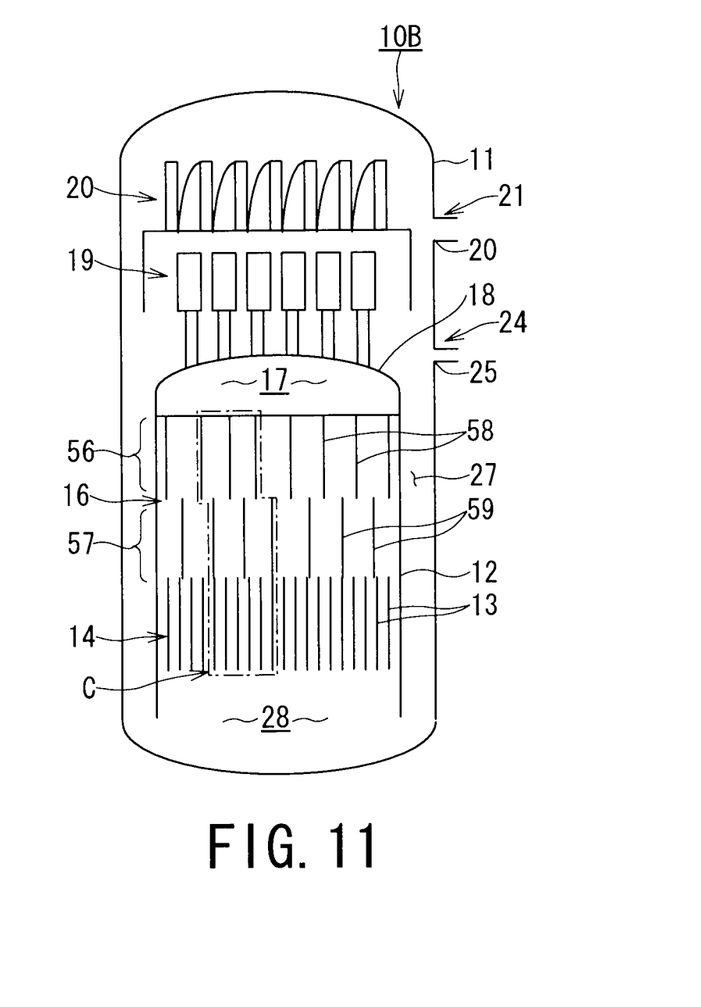
FIG. 11 is a schematic elevational sectional view of the natural-circulation BWR of a modification of the third embodiment according to the present invention.
Figure 12:
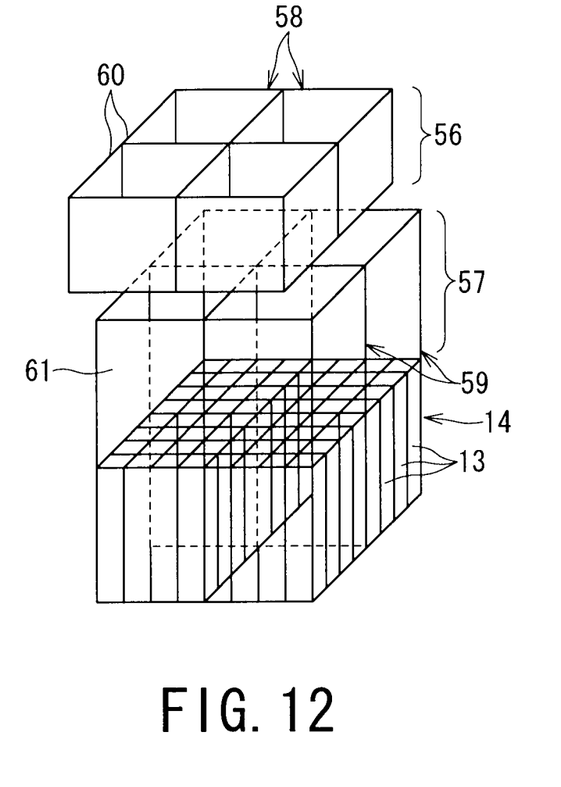
FIG. 12 is an enlarged perspective view of C portion of FIG. 11.

FIGS. 11 and 12 are drawings showing a modification of the third embodiment of the natural-circulation BWR.

FIG. 11 is a schematic elevational sectional view of the natural-circulation BWR 10B of the modification of the third embodiment and FIG. 12 is an enlarged perspective view of C portion of FIG. 11.

Upon describing the modification, like reference characters designate like components common to the natural-circulation BWR 10B according to the third embodiment, and the duplicated description is omitted herein. In the natural-circulation BWR 10B of the modification, a vertically divided structure of the chimney 16 provided above the reactor core 14 differs from that of the chimney shown in FIGS. 9 and 10.

In the natural-circulation BWR 10B of the modification, divided chimney regions 56 and 57 formed above a plurality of the fuel assemblies 13 are also divided into a plurality, two for example, of divided chimney regions in a chimney height direction. The central position of the rectangular-columnar upper divided chimneys is shifted from that of the similar rectangular-columnar lower divided chimneys in the radial direction of the reactor core 14, specifically in the horizontal direction. The shift amount in the core radial direction is appropriately set within the range of the width size of one chimney of divided chimneys 59.

In the natural-circulation BWR 10B of the modification, by shifting the central position of rectangular-columnar lattice plates 60 of upper divided chimneys 58 from that of the rectangular-columnar lattice plates 61 of lower divided chimneys 59, the pressures of the fuel assemblies 13 can be equalized on the upstream side from the outlet of the upper divided chimneys 58.

In such a manner, since the pressures of the fuel assemblies 13 can be equalized on the upstream side from the outlet of the chimney 16, the pressure boundary in the upper portion of the reactor core, which is important for the stability, can be lowered so as to reduce the vapor/liquid two-phase flow region. Thus, the transport lag can be eliminated within the divided chimneys 58 and 59, so that the stability can be improved.

The invention claimed is:

1. A natural-circulation type boiling water reactor comprising:
    a plurality of divided chimneys provided above a reactor core and charged with a number of fuel assemblies in the reactor core, each of the plurality of divided chimneys includes plural rectangular-columnar lattice plates,
    wherein a pressure equalization structure is provided on at least one of the rectangular-columnar lattice plates below an intermediate section in an axial height direction of the divided chimneys below a top end of the divided chimneys, and pressures of the divided chimneys are equalized by the pressure equalization structure.

2. The natural-circulation type boiling water reactor according to claim 1, wherein the pressure equalization structure is configured to form one or more connection holes on surfaces of the lattice plates of the divided chimneys so as to equalize the pressures of the divided chimneys by the connection holes of the divided chimneys.

3. The natural-circulation type boiling water reactor according to claim 1, wherein the pressure equalization structure is configured to form a slit on surfaces of the lattice plates of the divided chimneys so as to equalize the pressures of the divided chimneys by the slit of the divided chimneys.

4. The natural-circulation type boiling water reactor according to claim 1, wherein the pressure equalization structure is configured to form a plurality of connection holes or slits on surfaces of the lattice plates of the divided chimneys so as to equalize the pressures of the divided chimneys.

5. The natural-circulation type boiling water reactor according to claim 1, wherein the pressure equalization structure is configured to form a clearance between the outlet of fuel channels and the lattice plates of the divided chimneys so as to equalize the pressures of the fuel assemblies by the clearance at the outlet of the fuel channels.

6. The natural-circulation type boiling water reactor according to claim 1, wherein in the plurality of the divided chimneys provided above the reactor core, one or more connection holes or slits are formed on each divided chimney arranged in an outermost circumferential region, one or more connection holes or slits are formed on each divided chimney arranged in the residual regions, and a connection hole or slit of each divided chimney arranged in the outermost circumferential region is formed larger in size than a connection hole or slit of each divided chimney arranged in the residual regions so as to equalize the pressures of the fuel assemblies arranged in the peripheral section.

7. A natural-circulation type boiling water reactor comprising:
    a plurality of divided chimneys provided above a reactor core and charged with a number of fuel assemblies in the reactor core,
    wherein a region of the divided chimneys is divided into a plurality of regions in a chimney height direction, a plurality of divided chimney regions separated by rectangular-columnar lattice plates are arranged in an upper group, a plurality of divided chimney regions separated by rectangular-columnar lattice plates are arranged in a lower group, the lower group being combined with the upper group at a portion below an intermediate section in an axial height direction of the divided chimneys, and a cross sectional area enclosed by the rectangular-columnar lattice plates of the upper group of the divided chimneys is configured to be larger than a cross sectional area enclosed by the rectangular-columnar lattice plates of the lower group of the divided chimneys so as to equalize pressures of the fuel assemblies arranged in the intermediate section in the chimney height direction.

8. The natural-circulation type boiling water reactor according to claim 7, wherein the cross-sectional area of the upper divided chimney is configured substantially equally to a total cross-sectional area of a plurality of lower divided chimneys.

9. A natural-circulation type boiling water reactor comprising:
    a plurality of divided chimneys provided above a reactor core and charged with a number of fuel assemblies in the reactor core,
    wherein the divided chimneys are divided into a plurality of groups in a chimney height direction, each of the divided chimneys in an upper divided chimney group is arranged entirely above each of the divided chimneys in a lower divided chimney group, and
    a central position of rectangular-columnar lattice plates of the upper divided chimney group is laterally shifted from that of rectangular-columnar lattice plates of the lower divided chimney group coupled with the upper divided chimney group and having a same flow area so as to equalize pressures of the fuel assemblies in an intermediate portion of the divided chimneys in the divided-chimney height direction.

10. The natural-circulation type boiling water reactor according to claim 9, wherein each divided chimney of the upper divided chimney group is horizontally shifted from each divided chimney of the lower divided chimney group by an amount that is greater than zero and less than a width size of a divided chimney of the lower divided chimney group.

* * * * *